July 5, 1938. O. R. OWENS Re. 20,787

ROUND CORNER

Original Filed May 21, 1936

Inventor:
Orville R. Owens,
By Bennett & Bennett
Attys.

Reissued July 5, 1938

Re. 20,787

UNITED STATES PATENT OFFICE 20,787

ROUND CORNER

Orville R. Owens, Chicago, Ill., assignor to Wells-Gardner & Company, Chicago, Ill., a corporation of Illinois Original No. 2,081,638, dated May 25, 1937, Serial No. 80,929, May 21, 1936. Application for reissue March 29, 1938, Serial No. 198,672

2 Claims. (Cl. 20—89)

My present invention relates to a rounded corner of wood or similar material, and to the process of making it. Round corners are often desired in the art of woodworking, but their production, if a bending operation is required, has been attended with considerable effort and expense and the results have not always been satisfactory. By the improvements of this invention I am enabled to perform a bending operation with facility, and to complete the operation with a great saving of time. The resulting round corner is ample in strength, it retains its shape and appearance, and it is otherwise suitable for use in trim, cabinets, furniture pieces of various kinds, etc.

The present improvements, and the method by which my invention is carried out, may be understood readily from the description to follow taken in conjunction with the accompanying drawing wherein—

Figure 1:
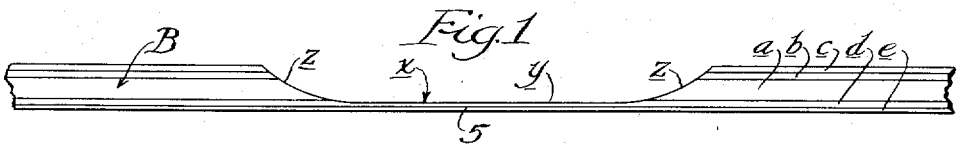
Figure 1 is a view in elevation looking toward the edge of a board after receiving in its body a cut preliminary to the bending operation.

It should be noted at the outset that my invention is applicable to boards which are solid or laminated, with or without a facing of veneer. By way of illustration the drawing shows a laminated board B made up of a wide central ply *a* upon one side of which are arranged two other narrow plies *b* and *c*, respectively. On its opposite side the central ply carries another narrow ply *d* to which is adhered a veneer facing *e*. In a laminated board of this description, the several plies are interconnected by a suitable adhesive, usually glue.

Figure 2:
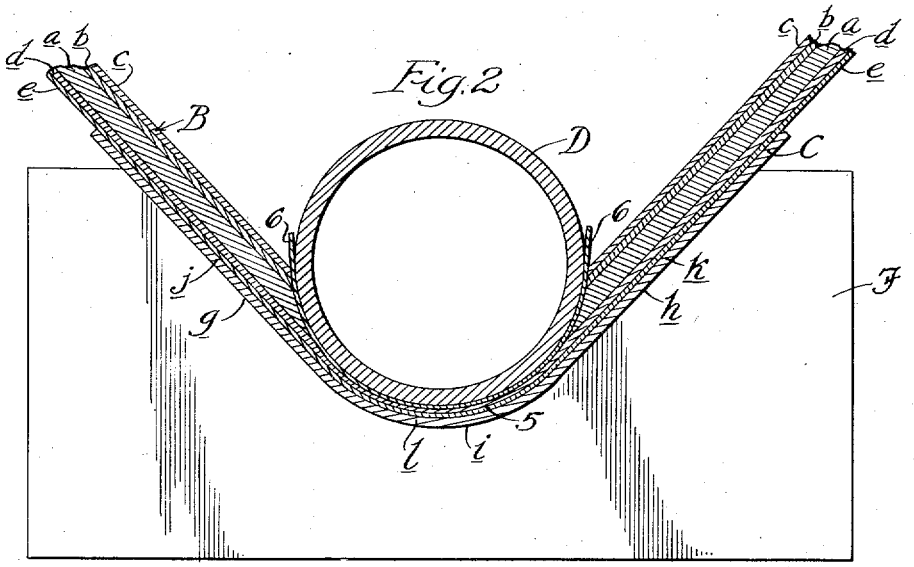
Fig. 2 is a longitudinal section through the board as it appears while under pressure during the bending operation in a form with a caul on one side and a cylindrical forming die on the other.
Figure 3:
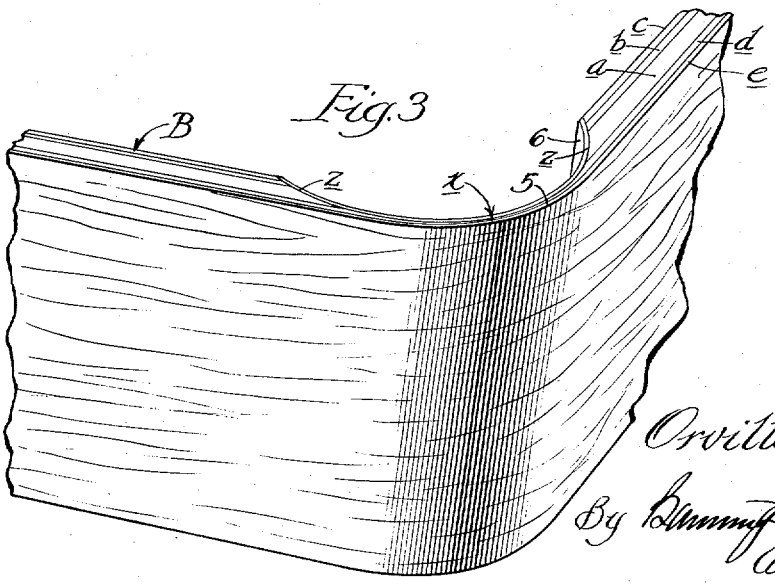
Fig. 3 is a view in perspective of the board after the bending operation has been completed.

To prepare a board for bending according to my invention, it is first provided with an elongated cut *x* extending for the depth of the bend and transversely through the board from one side thereof well toward the opposite side so as to leave only a connecting web 5. For the major part of its length, i. e., in a direction longitudinally of the board, this cut is straight as at *y*, its two ends *z*, however, being beveled to provide shoulders or being curved concavely through arcs which may be concentric with the rounded corner of the board which is produced through a subsequent bending of its web portion. With a laminated board, as shown in Fig. 1, the depth of the cut may be such that the remaining web is merely the thickness of the veneer facing, or of the veneer and the adjacent ply, or of a part thereof, or of adjacent plies. As shown in Fig. 2, a reinforcing veneer strip 6, of one or more plies, is next fitted within the board cut *x*. This strip may extend through substantially 180 degrees when the board is bent through a 90 degree turn, as shown. This veneer strip which follows the bend of the web 5 and of the curvatures at its two ends, conforms also to the curved contour of a forming die D here shown as a cylindrical tube. At the time the die is placed against the reinforcing veneer strip at one side of the board, the latter is supported upon a receiving form F having a seat provided by two angled surfaces *g* and *h* connected by a curved surface *i* wherein is fitted a caul C having two angled flanges *j* and *k* connected by a curved section *l*. By moving the forming die toward the seat thus provided in the receiving form, the board is bent along its web portion through the angle which corresponds to the angled surfaces *g* and *h* of the receiving form, viz., 90 degrees, as shown. When this position is reached, the board is conformed to the angled caul C fitted into the seat of the receiving form having a contour identical therewith, whereby there is furnished a hard surface for resisting the pressure imparted through the board by the forming die. The die, which may be heated, is cylindrical so that its axis will be concentric with the two curved surfaces *z*, as indicated in Fig. 2.

The reinforcing veneer strip is adhered to the web and adjacent curved portions by a suitable glue or other adhesive which is soft at the time the forming die is operated. If the board be laminated or have an outer veneer facing, the connecting layers of adhesive may be softened somewhat by the heated die whereby to facilitate bending of the web. In addition, the heat imparted from the metal forming die will accelerate the drying and setting of the glue or other adhesive which connects the reinforcing veneer strip to the inner surface of the bent corner. After a short space of time, perhaps five minutes, the forming die may safely be removed whereupon the board, now bent through its intended arc, is ready for removal from the caul.

In practice, it will be found that a corner construction answering to this description is strong and will retain its original bend with little or no deformation. This results from utilizing a board of substantial thickness with a curved web that is relatively thin with beveled or concave shoulders at its two ends, together with a reinforcing strip adhered to the inside of the corner and extending through an arc considerably longer than that of the web itself. Such a board can be used in many places, notably furniture pieces and building trim.

I claim:

1. A veneer board bent through an arc and integrally reinforced to provide a rigid, round and hollow corner structure, said board being provided on one face with a cut-out section which extends for the depth of the bend, said cut-out section extending into the body of the board to a point just short of its outer surface layer to provide a thin web portion of substantially uniform thickness which extends along the board for a distance substantially equal to the length of the arc of the bend and terminating at its two ends in shoulders bevelled to the normal inner surface of the board, and a veneer strip bent to the curvature of the web portion and adhered to the inner surface thereof and to the faces of the bevelled shoulders to exert a tension force for counterbalancing that of the board, whereby to resist deformation of the round corner structure.

2. A veneer board bent through an arc and integrally reinforced to provide a relatively rigid, round and hollow corner structure, said board being provided on its inner face with a cut-out section which extends into the body of the board a distance sufficient to provide a relatively flexible web portion which is substantially co-extensive with the length of the arc of the bend and joining the normal inner surface of the board at its ends, and a strip bent with the board to the curvature of the web portion and adhered thereto throughout the length and breadth of the strip to exert a tension force for counterbalancing that of the board in resisting deformation of the round corner structure.

ORVILLE R. OWENS.